(12) United States Patent
Hofer

(10) Patent No.: US 6,216,841 B1
(45) Date of Patent: Apr. 17, 2001

(54) HYDRAULIC CLUTCH

(75) Inventor: Manfred Hofer, Graz (AT)

(73) Assignee: Steyr-Daimler-Puch Fahrzeugtechnik AG & Co KG, Vienna (AT)

( * ) Notice: Subject to any disclaimer, the term of this patent is extended or adjusted under 35 U.S.C. 154(b) by 0 days.

(21) Appl. No.: 09/213,180

(22) Filed: Dec. 17, 1998

(30) Foreign Application Priority Data

Dec. 23, 1997 (AT) ...................................................... 2181/97

(51) Int. Cl.[7] ................................................ F16D 43/284
(52) U.S. Cl. ...................................... 192/103 F; 192/82 T
(58) Field of Search ............................. 192/35, 103 F, 192/49, 57, 87.12, 82 T

(56) References Cited

U.S. PATENT DOCUMENTS

| | | | |
|---|---|---|---|
| 4,719,998 | * | 1/1988 | Hiramatsu et al. ............ 192/103 F X |
| 4,727,966 | * | 3/1988 | Hiramatsu et al. ............ 192/103 F X |
| 4,924,989 | * | 5/1990 | Filderman ........................ 192/103 F |
| 5,046,595 | * | 9/1991 | Sumiyoshi et al. ........... 192/103 F X |
| 5,197,583 |   | 3/1993 | Sukai et al. .......................... 192/35 |
| 5,611,746 |   | 3/1997 | Shaffer ................................. 475/88 |
| 5,827,145 | * | 10/1998 | Okcuoglu ..................... 192/103 F X |

\* cited by examiner

Primary Examiner—Rodney H. Bonck
(74) Attorney, Agent, or Firm—Karl Hormann

(57) ABSTRACT

A hydraulic coupling for use in the drivetrain of an automotive vehicle and responsive to differences in rotation between a rotatively driven casing journaled in a rotary insert in a fixed housing and a rotatively driven member is provided with a friction clutch actuated by a piston responding to fluid pressure generated in a pressure chamber by a pump in response to differences in rotation, the pressure being controllable by a proportional valve mounted on the housing and connected to the pressure chamber by a conduit extending through the rotary insert. The proportional valve may be controlled by signals representative of vehicular operational conditions and ensures quick and complete disengagement of the clutch.

11 Claims, 1 Drawing Sheet

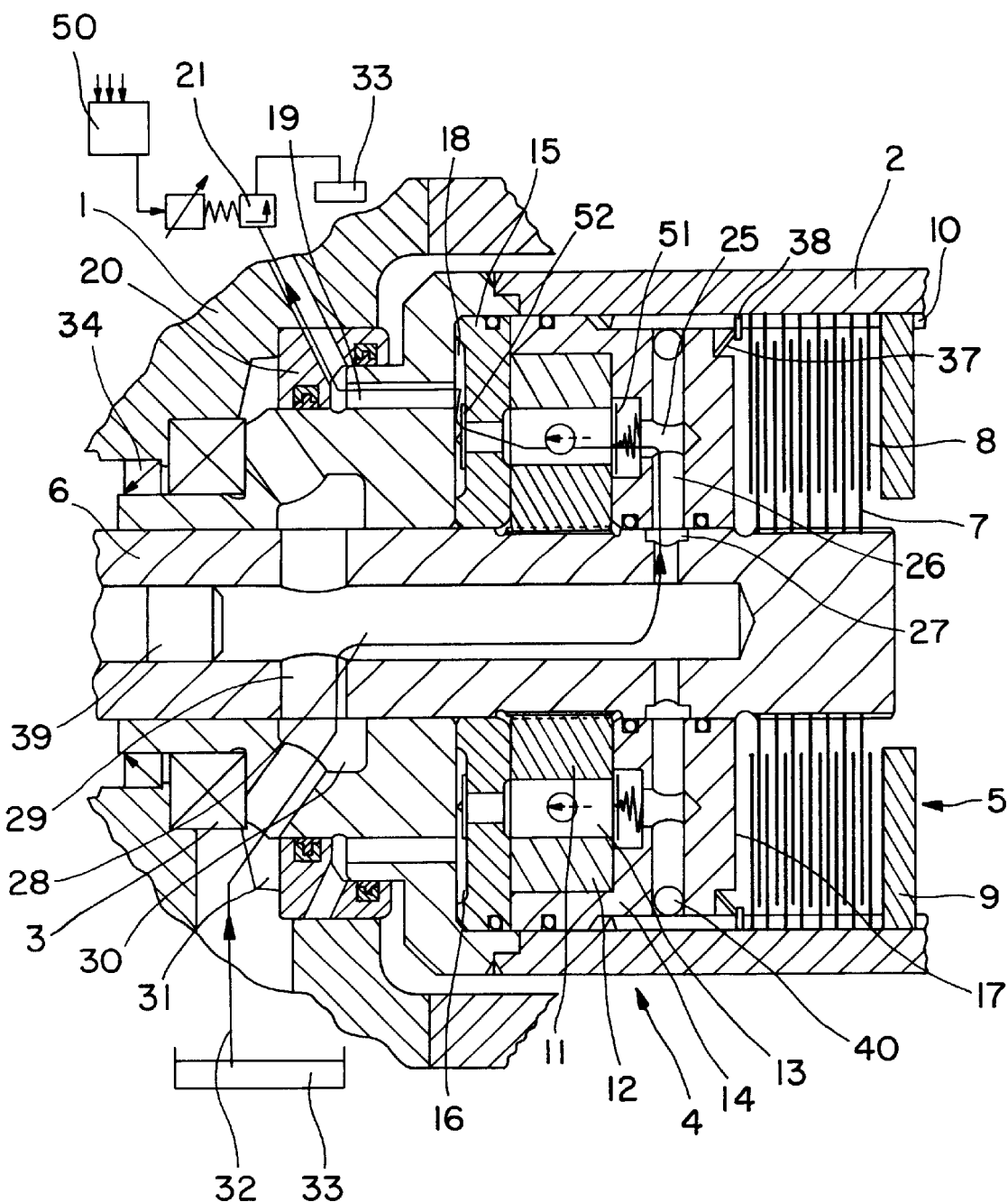

HYDRAULIC CLUTCH

BACKGROUND OF THE INVENTION

1. Field of the Invention

The invention, in general, relates to a hydraulic clutch which is responsive to differences in rotation and which consists of a rotatable input casing, a hydrostatic pump within the casing, an output shaft and a friction clutch for connecting the output shaft to the input casing and, more particularly, to a hydraulic clutch provided with a chamber in which, at the occurrence of a difference in rotations between the input casing and the output shaft, fluid pressure is generated by a pump supplied from a suction chamber for actuating the friction clutch.

2. The State of the Art

Such couplings are used in different configurations in the drivetrains of automotive vehicles for the direct transmission of torque or for blocking an associated differential transmission as well as for powering wheels of an axle or for distributing drive torque between two axles. Each of these couplings utilizes a hydrostatic pump comprising an internal rotor and an external rotor which move relative to each other, and thereby generate fluid pressure, in case the rotations of the input casing and of an output shaft differ.

Hydraulic couplings of this general type are disclosed, for instance, by FIG. 14 of WO 93/19310 and FIG. 12 of U.S. Pat. No. 5,611,746. These couplings are provided with a hydrostatic pump inside of a hollow rotatable casing, and in each case the pump has a pressure and a suction chamber equipped with simple throttles and spring-biased valves responding to predetermined pressures to accommodate certain boundary conditions.

Such arrangements are, however, unsuited for controlling the coupling in a predictable manner. Indeed, such arrangements do not allow adjustments of the transmitted torque relative to differences in rotation or varying temperatures of the operating fluid. These couplings cannot be released when braking with ABS, when the vehicle is being towed, at high speeds or when the clutch is thermally overloaded.

OBJECT OF THE INVENTION

It is, therefore, it is an object of the invention to provide a coupling of the kind referred to which is of a simple and reliable construction and which may be quickly released and adapted to different operating conditions under a desirably patterned control.

SUMMARY OF THE INVENTION

In accordance with the invention, the above and other objects are accomplished in a hydraulic coupling of the kind referred to, the pressure chamber of the hydrostatic pump of which communicates by way of a rotary insert with a fixed housing in which there is provided a valve for controlling the pressure within the pressure chamber. In this manner, the pressure in the chamber may be modulated, with the control valve being mounted in the fixed housing of the coupling so that it poses no problems to feed it with electrical control signals from an external control module.

Preferably, the pressure chamber is formed between the rotatable input casing and an annular piston, with the hydrostatic pump being seated within an annular piston. The number of parts otherwise required may thus be reduced, and the assembly is simplified since the annular piston and the pump may be preassembled as a unit. Notwithstanding the reduction of its structural dimensions, the piston may be formed with a large active surface thereby to provide for a particularly sensitive control and for an instantaneous response of the coupling.

In an advantageous embodiment of the invention, a suction chamber is formed within the annular piston and communicates with an axial bore in the output shaft by way of a further rotary insert. Accordingly, the suction flow may also be modulated and the rotating piston of the pump may relatively easily be supplied with operating fluid.

In an advantageous embodiment, each end of the annular piston forms an annular radial surface, one of the surfaces limiting the pressure chamber, the other surface cooperating with discs of the friction clutch. The pressure chamber is, therefore, located at an end of the annular piston while the friction clutch is located at the opposite end of the piston. Accordingly, there is no need for separate clutch actuating elements. As a result of this and the large piston surface the space required for the friction clutch may be kept very small.

In a further embodiment of the invention, an annular spring may be provided between the other radial surface of the piston and the input casing for biasing the annular piston away from the discs of the friction clutch. Such an arrangement ensures a complete and, if necessary, quick release of the clutch when braking, for instance. It also defines a response threshold for the prevention of what for the sake of convenience may be called tight-corner-braking.

In a further embodiment of the invention, the valve for controlling the pressure in the pressure chamber is a proportional valve fed by a control module with a control signal which is both representative of driving conditions and dependent upon the temperature of the pressure medium.

BRIEF DESCRIPTION OF THE SINGLE DRAWING

The novel features which are considered to be characteristic of the invention are set forth with particularity in the appended claims. The invention itself, however, in respect of its structure, construction and lay-out, as well as manufacturing techniques, together with other objects and advantages thereof, will best be understood from the following description of a preferred embodiment when read with reference to the appended single drawing which depicts a preferred embodiment of the hydraulic coupling in accordance with the invention in axial section.

DETAILED DESCRIPTION OF THE PREFERRED EMBODIMENT

The entire hydraulic coupling in accordance with the invention is enclosed in a fixed housing 1. A fractional portion of the housing 1 is shown in the drawing. Since the embodiment described relates to direct transmission of torque to two half-shafts, those skilled in the art are assumed to know that a second identical coupling (not shown) is mounted in mirror-symmetrical fashion to the right of the coupling shown in the drawing. Within the housing 1 there is provided a rotatively driven member indicated as a cup-shaped hollow casing 2 which is supported at each and by a bearing 3. Inside of the casing 2 there are mounted a hydrostatic pump generally indicated by reference numeral 4 and a friction clutch 5. An output shaft 6, being a half-shaft for powering a wheel (not shown), extends into the casing 2 from the left side thereof.

The friction clutch 5 is made up of a plurality of inner discs 7, outer discs 8 interdigitated therewith, and a floating spacer disc 9. The outer discs 8 and the spacer disc 9 are axially moveable in splines 10 provided in the inner surface of the casing 2 and are rotatable therewith. Similarly, the inner discs 7 are rotatable with, and axially moveable in splines, relative to the output shaft 6.

The hydrostatic pump 4 consists of an internal rotor 11 and an eccentric external rotor 12 forming between them an operating or pumping chamber 13. The rotors 11 and 12 are housed in an axial cavity of an annular piston 14 for rotation relative to each other whenever there is a difference in rotations between the casing 2 and the shaft 6. The annular piston 14 is moveable axially of the casing 2 in the splines 10 and of the shaft 6. In the arrangement shown, the piston 2 rotates with the casing 14 relative to the shaft 6 and the internal rotor 11 rotates with the shaft 6 relative to the external rotor 12.

The annular piston 14 is affixed to an annular disc or cap 15. The axial dimension of the piston 14 is limited by left and right annular surfaces 16 and 17. Together with the casing 2, the annular surface 16 forms a pressure chamber 18 which is connected to a proportional valve 21 which is mounted on the fixed housing 1, by way of a conduit 19 and a rotary fluid link 20. If the valve 21 is in its open state there is no pressure in the chamber 18. Conversely, if the valve 21 is in its closed state pressure will build up in the chamber 18 and cause the annular piston 14 to shift to the right into contact with the clutch which is thereby engaged. The rate at which pressure builds up is determined by the proportional valve 21. Accordingly, the torque which is transmitted by the clutch is a function of the position of the proportional valve 21.

Moreover, there is provided within the annular piston 14 a suction chamber 25 which communicates with an axial bore 28 in the output shaft 6 by way of one or more radial conduits 26 and a further rotary fluid link 27 which consists of an annular duct surrounding the shaft 6 and suitable packings in the piston 14 on opposite sides of the annular duct. Transverse bores 29 extending from the axial bore 28 lead to an annular chamber 30 formed between the casing 2 and the output shaft 6. The chamber 30 is in turn connected to a suction chamber 31 formed between the interior of the fixed housing 1 and the exterior of the casing 2. The suction chamber 31 is closed by packings in the rotary fluid link 20 on the one hand and by a further packing ring 34 on the other hand. A suction conduit 32 leads from the suction chamber 31 to a sump 33 at the bottom of the fixed housing 1.

The right annular surface 17 of the annular piston 14 is adapted to cooperate with the discs 7 and 8 of the friction clutch 5 and is biased away from the discs by an annular spring 37 abutting a snap ring in the casing 2. The axial bore 28 in the output shaft 6 is a blind bore closed by a sealing plug 39. The radial conduits 26 in the annular piston 14 are each similarly closed by a caulked or press-fitted ball 40.

At one side, the operating or pumping chamber 13 of the hydrostatic pump 4 is connected to the suction chamber 25 by a check valve 51, and at its other side, it connects to the pressure chamber 18 by a check valve 52. Electrical signals derived from data representative of the operating condition of a vehicle are fed to the proportional valve 21 from a control module 50, to control the rate of fluid flow from the pressure chamber 18 and, thus, the extent to which the clutch 4 is engaged by the annular piston 14.

What is claimed is:

1. A hydraulic coupling for use in an automotive vehicle, comprising:

a fixed housing;

a rotatively driven hollow casing journaled in the housing;

a rotatable output shaft;

a friction clutch selectively actuable in a range between a first state in which the casing and the shaft are rotatable relative to each other and a second state in which the casing and the shaft are drivingly connected to each other;

means for forming a suction chamber;

means for forming a pressure chamber;

a hydrostatic pump responsive to differences in rotation between the hollow casing and the output shaft for generating pressure in the pressure chamber by pumping fluid from the suction chamber;

means moveable as a function of the pressure for actuating the clutch to the second state;

means for forming a first rotary fluid link intermediate the housing and the casing; and means for forming a valve mounted in the housing and connected to the pressure chamber through the first rotary fluid link for controlling the pressure in the pressure chamber.

2. The hydraulic coupling of claim 1, wherein the actuating means comprises a piston mounted in the casing and wherein the pressure chamber is located between the piston and the casing.

3. The hydraulic coupling of claim 2, wherein the hydrostatic pump comprises first and second members housed in the piston, the first member being connected to the shaft and the second member being adapted for selective rotation with the casing.

4. The hydraulic coupling of claim 3, wherein the piston is an annular piston slideably mounted on the shaft.

5. The hydraulic coupling of claim 4, further comprising;

means for forming a suction chamber in the piston;

a fluid sump provided in the housing;

means for forming a second rotary fluid link intermediate the shaft and the piston; and a fluid conduit extending at least in part through the shaft for connecting the suction chamber to the sump through the second rotary fluid link.

6. The hydraulic coupling of claim 5, wherein the piston is provided with first and second annular end surfaces for respectively limiting the pressure chamber and selectively actuating the clutch to its second state.

7. The hydraulic coupling of claim 6, further comrising means intermediate the second annular end surface and the clutch for resiliently biasing the piston away from the clutch.

8. The hydraulic coupling of claim 7, wherein the biasing means comprises an annular spring.

9. The hydraulic coupling of claim 8, further comprising means for controlling the valve on the basis of signals representative of the state of movement of the vehicle.

10. The hydraulic coupling of claim 1, wherein the means for controlling the fluid pressure comprises a proportional valve.

11. The hydraulic coupling of claim 10, wherein the signals are modified by the temperature of the fluid medium.

* * * * *